Dec. 18, 1934.  A. MILLER  1,985,187
VEHICLE TIRE
Filed May 13, 1933
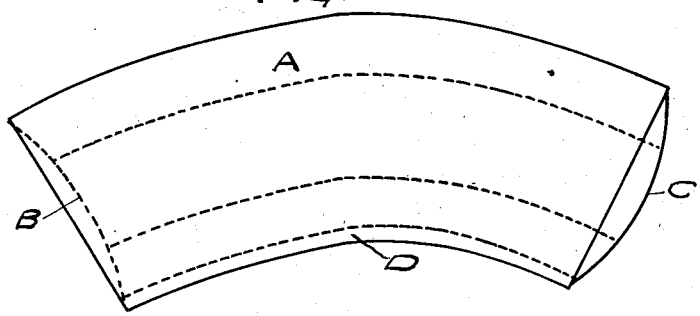
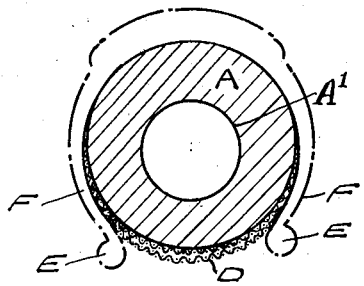
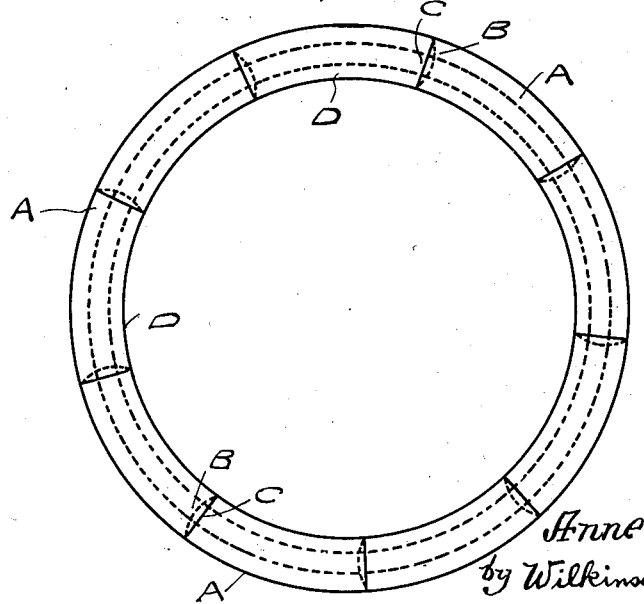
Inventor
Anne Miller
by Wilkinson & Mawhinney
Attorneys.

Patented Dec. 18, 1934

1,985,187

UNITED STATES PATENT OFFICE 1,985,187

VEHICLE TIRE

Anne Miller, Thurso, Caithness, Scotland

Application May 13, 1933, Serial No. 670,983
In Great Britain June 17, 1932

1 Claim. (Cl. 152—5)

My invention relates to improvements in cushion tires for motor cars, motor cycles and other vehicles of the type fabricated from interlocking blocks of resilient compressible material used in conjunction with an outer cover of the known type. It has for its object, inter alia to dispense with an inner air tube and yet have the same resiliency and comfort when running, as on any vehicle fitted with the most up-to-date pneumatic tire, and with, of course, no fear of puncture, thereby considerably increasing the lift of the tire, as the outer cover can be used to the last layer of canvas without fear of bursting, which at very high speed is a great danger, and there can be no wobbling or skidding, which is also a source of danger with existing tires.

According to this invention, the tires are formed of rubber sectors or sections approximately from 8″ to 12″ long and varying in diameter to meet the requirements of the various sizes of the present wheel and outer covers. These sectors are of tubular construction and are preferably oval in cross section, having concave and convex ends into which sectors interfit to ensure even surface pressure. The sector or section is composed of resilient rubber slightly vulcanized on the outside, while the bottom is reinforced to the extent of say $\frac{3}{16}$″, with canvas or such like tapering to zero at its edges and extending over about two thirds the surface of the sector in its cross-section. This reinforcement is to prevent chafing between the bead of the tire and rim of the wheel. It also reinforces and strengthens the skirt or thinnest part of the tire wall. The tire having thus become substantially homogeneous, the dreaded wobble so common in air inflated tubes, when cornering, has been eliminated, there being little or no air to displace and cause distortion of the outer cover. Thus not only objectionable wobble but also skidding is prevented.

In order that my invention may be properly understood and readily carried into effect, I have hereunto appended one sheet of drawings, of which Figure 1 is an elevation of one of the sectors or sections.

Figure 2 is a cross sectional view of Figure 1 with the addition of the outer cover, in dot and dash lines.

Figure 3 is an elevation of an assembly of the sectors or sections.

Referring to the drawing, A are the rubber sectors or sections of which the tire is formed, while B and C are the concave and convex ends respectively of the sectors or sections A. Each of these sections A is oval shaped in cross section, and provided with an opening or passageway A′ extending therethrough from the concave end B to the convex end C. This opening A′ is located to present a thin wall in each section adjacent the rim of the wheel and the interior side walls of the tire, and a relatively thick wall to contact with the interior of the tire adjacent the tread. D is the reinforced canvas bottom, the reinforcement prevent chafing between the bead E of the tire, and the rim of the wheel, and strengthens the thinnest part F of the tire.

The method of applying the above to vehicles at present using air tubes, is as follows, viz:—

The inner tube is removed in the ordinary manner by leaving one side of the tire on the wheel, the inside being well dusted with French chalk, after which the bead of the tire is fully extended and the sectors or sections A placed close together with reinforced side D down, Figure 3. When the tire is fully packed, a compressor is inserted between the end of two sectors or sections A, and compressed sufficiently to allow another sector or section A to be placed in position, and the compressor is then withdrawn. The outer cover is replaced in the ordinary manner with the tire levers. When replaced, the sectors or sections A being compressed increases the pressure upwards to the tread of the tire. If properly packed, the tire is capable of carrying the weight of an ordinary pleasure motor car, together with its occupants, without undue distortion or flattening.

I claim:

An enclosed core for vehicle tire casings comprising a plurality of sections of resilient rubber having a central opening therethrough with oppositely disposed convex and concave end portions for interlocking the sections, each of said sections being oval shaped in cross section to provide a relatively thick wall for engaging the interior of the casing adjacent the tread thereof and a relatively thin wall adjacent the wheel rim and beads of the casing, and reinforcing members secured to each of said sections along the thin wall of each section to provide a circular tube and engaging the rim and beads to prevent chafing the thin wall on the rim and on the beads of the casing.

ANNE MILLER.